United States Patent [19]

Murayama et al.

[11] 4,021,509

[45] May 3, 1977

[54] PRODUCTION OF IMPACT-RESISTANT, THERMOPLASTIC RESIN COMPOSITIONS

[75] Inventors: Naohiro Murayama; Takayuki Katto; Yo Iizuka; Teruo Sakagami, all of Iwaki, Japan

[73] Assignee: Kureha Kagaku Kogyo Kabushiki Kaisha, Tokyo, Japan

[22] Filed: Apr. 17, 1975

[21] Appl. No.: 569,071

[30] Foreign Application Priority Data

Apr. 18, 1974  Japan ............................ 49-43744
Apr. 18, 1974  Japan ............................ 49-43745

[52] U.S. Cl. .................... 260/880 R; 260/876 R
[51] Int. Cl.² .................................. C08L 9/06
[58] Field of Search .................. 260/880 R, 876 R

[56] References Cited
UNITED STATES PATENTS

| 3,018,268 | 1/1962 | Daly | 260/880 R |
| 3,288,886 | 11/1966 | Himei | 260/876 R |
| 3,296,339 | 1/1967 | Feuer | 260/880 R |
| 3,444,269 | 5/1969 | Beer | 260/876 R |
| 3,717,688 | 2/1973 | Koyanagi | 260/880 R |
| 3,804,924 | 4/1974 | Papetti | 260/880 R |

FOREIGN PATENTS OR APPLICATIONS

| 873,948 | 8/1961 | United Kingdom |
| 892,910 | 4/1962 | United Kingdom |

*Primary Examiner*—Paul R. Michl
*Attorney, Agent, or Firm*—Wenderoth, Lind & Ponack

[57] ABSTRACT

A thermoplastic resin composition of excellent transparency and high impact strength is produced by causing methyl methacrylate and styrene monomers to undergo post polymerization in the presence of a conjugated diolefin polymer rubber latex containing at least 50 percent by weight of a conjugated diolefin monomer as the constituent of the rubber such as butadiene, wherein a polyethylene oxide of an average molecular weight of at least 100,000 has been added to the rubber latex either prior to or at the time of the post polymerization to cause the rubber latex to partly coagulate, thereby to prepare a graft polymer. The graft copolymer can be blended with methyl methacrylate-styrene copolymers.

6 Claims, 4 Drawing Figures

PRODUCTION OF IMPACT-RESISTANT, THERMOPLASTIC RESIN COMPOSITIONS

BACKGROUND OF THE INVENTION

This invention relates generally to the production of transparent, impact-resistant, thermoplastic resin compositions. More particularly, the invention relates to a novel process for producing methyl methacrylate-styrene resin compositions having excellent transparency and retaining impact resistance (impact strength).

Heretofore, it has been generally known that methyl methacrylate-styrene copolymers (hereinafter referred to as MS copolymers) have excellent transparency but have disadvantageously poor resistance to impact. Various attempts have been made to improve the impact resistance of these MS copolymers, but to date, solving this problem fully has been difficult.

As a result of our research, we have succeeded in obtaining:

1. a graft copolymer (hereinafter referred to as an MBS graft copolymer) obtained by adding a small quantity of a polyethylene oxide of high molecular weight to a rubber latex having as its predominant constituent of the rubber a diolefin monomer thereby to cause partial coagulation of the rubber latex and thereafter subjecting a monomer mixture of methyl methacrylate and styrene to post polymerization in the presence of the rubber latex, and 2. a composition obtained by mixing the above mentioned MBS graft copolymer and an MS copolymer.

In either of the above cases (1) and (2), a methyl methacrylate-styrene thermoplastic resin having excellent transparency and, at the same time, impact resistance was obtained.

A feature of this invention is that, in the step of adding the monomer mixture of methyl methacrylate and styrene to a conjugated diolefin polymer rubber latex or a copolymer rubber latex having a conjugated diolefin as a predominant constituent of the rubber in the production of an MBS graft copolymer in either of the above cases (1) and (2), a high molecular polyethylene oxide of an average molecular weight of 100,000 or more is added prior to, or at the time of, such addition step, for the post polymerization of the above mentioned monomer mixture to cause the rubber latex to partly coagulate thereby to impart impact resistance to the methyl methacrylate-styrene resin.

That is, we have found the above described feature affords the following possibilities. It is possible to obtain an impact resistance which is superior by far to that obtainable in an MBS graft copolymer produced from a rubber latex which has not been coagulated with a polyethylene oxide of high molecular weight. Furthermore, particularly in the production of an MBS graft copolymer, an MBS graft copolymer obtained from a rubber latex to which a polyethylene oxide having an average molecular weight greater than 100,000 has been added is superior in impact resistance to an MBS graft copolymer obtained from a rubber latex in which a polyethylene oxide of low molecular weight such as, for example, a polyethylene oxide ordinarily called a polyethylene glycol of a molecular weight of the order of 200 to 20,000, has been used. In addition, when a polyethylene oxide of high molecular weight is use according to this invention, a methyl methacrylate-styrene thermoplastic resin of impact resistance superior to those in cases where other high molecular weight coagulants such as polyvinyl alcohol and methylcellulose are used is obtained.

Furthermore, in the production of an MBS graft copolymer, as is known, the index of refraction of the resin varies depending on the composition of the rubber used.

At the time of post polymerization, however, the proportions of the methyl methacrylate and styrene can be so selected that the index of refraction of the post polymerizate approaches that of the rubber, and, also in the MS copolymer to be mixed with this MBS graft copolymer, the proportions of the methyl methacrylate and styrene can be selected to cause the index of refraction to approach that of the MBS graft copolymer in a simple manner. In this manner, it is possible to impart transparency to the resin.

The nature, utility, and further features of the invention will be apparent from the following detailed description beginning with a consideration of general details of the invention and concluding with specific examples of practice illustrating preferred embodiments of the invention.

BRIEF DESCRIPTION OF THE ILLUSTRATIONS

In the illustrations:

FIGS. 1A abd 1B respectively correspond to polymerization formed products A and B of Example 5 set forth hereinafter, while FIGS. 2 and 3 respectively correspond to example (a) and control example (c) of Example 6.

The magnification of all photomicrographs is 27,600 X.

DETAILED DESCRIPTION

Rubber latex

The only requirement for the rubber latex component in the production of an MBS graft copolymer resin in accordance with this invention is that the predominant constituent thereof be a copolymer of a monomer mixture of more than 50 percent by weight of a conjugated diolefin monomer and at least one kind of a mono-olefin monomer copolymerizable therewith. However, butadiene and styrene are generally used respectively for the conjugated diolefin monomer and the monomer copolymerizable therewith.

Of course, one kind or a mixture of two or more kinds of other monomers such as isoprene and chloroprene or a mixture of butadiene therewith may be used for the conjugated diolefin monomer. Examples, in addition to styrene, of the monomer copolymerizable with the conjugated diolefin monomer are substituted styrene such as α-methylstyrene and vinyl toluenes; acrylonitrile, various esters of acrylic acid with an alcohol of for example, from 1 to 20 carbon atoms; and vinyl ethers such as methyl vinyl ether, and methyl propenyl ethers. These monomers are used singly, in mixtures of two or more thereof, or in mixtures of these monomers with styrene. Furthermore, this monomer may contain a crosslinking agent such as dimethacrylates such as ethylene glycol dimethacrylate and diethylene glycol dimethacrylate and divinyl benzene either singly or as mixtures of two or more thereof. In addition, a chain-transfer agent of a mercaptan such as normal dodecylmercaptan or tertiary dodecylmercaptan can be used in small quantity.

However, quantities of these cross-linking and chain-transfer agents are each ordinarily below 3 percent of the quantity of the monomers used in the copolymerization and are each preferably from 0.01 to 1 percent by weight. It is necessary that the conjugated diolefin unit within the copolymer rubber be greater than 50 percent by weight, preferably from 55 to 98 percent by weight, in order to cause the copolymer rubber to exhibit its full performance as a rubber.

The rubber latex may be produced by the known emulsion polymerization process. While there is not particular necessity for limiting the basic particle size of the latex, it is preferably from 200 A to 3,000 A. We have found that the use of a rubber latex produced with low conversion of from 30 to 80 percent in this case facilitates the production of a resin of excellent impact resistance. Even with a latex of a conversion of 100 percent, however, it is possible to obtain a methyl methyacrylate-styrene resin which can be satisfactorily used in actual practice.

Partial coagulation of latex

In the next step, a polyethylene oxide of high molecular weight is added to the above described rubber latex thereby to carry out partial coagulation of the latex.

In general, this polyethylene oxide is added in the form of an aqueous solution. While the quantity of the polyethylene oxide thus added differs with factors such as the molecular weight thereof and the quantity of rubber within the latex, it is ordinarily from 0.01 to 2.0 parts by weight, preferably from 0.03 to 2.0 parts by weight, relative to from 5 to 70 parts by weight of the quantity of rubber in the latex.

If the quantity of the polyethylene oxide is less than this range, the coagulating effect will be feeble, and the resulting MBS graft copolymer or the composition of this copolymer and the MS copolymer will be deficient in impact resistance. On the other hand, if the quantity is greater than the above indicated range, the coagulating effect will be strong, but difficulties such as excessive increase in the viscosity of the latex will arise, and, moreover, the use of a large quantity of the polyethylene oxide raises the production cost.

The greater the molecular weight of the polyethylene oxide thus used according to the invention, the greater is the coagulating effect. Accordingly, a polyethylene oxide of an average molecular weight of or greater than 100,000, preferably 100,000 to 10,000,000 is ordinarily used.

To this rubber latex thus caused to coagulate partially by the above described polyethylene oxide of high molecular weight, styrene and methyl methacrylate are added and thereby caused to polymerize. This addition of the styrene and methyl methacrylate may be carried out simultaneously with the addition of the polyethylene oxide to the rubber latex.

Post polymerization

The post polymerization of the styrene and methyl methacrylate is carried out by the procedure of known emulsion polymerization similar to the first-stage polymerization of the rubber. In general, the post polymerization product obtained by adding methyl methacrylate and styrene to the rubber latex coagulated well with the polyethylene oxide of high molecular weight and subjecting the resulting process materials to post polymerization is obtained in a state wherein the polymerized materials have been partially or mostly separated. In this case, by adding an emulsifier prior to or after the addition of the polyethylene oxide, or by carrying out a measure such as intensifying agitation, the dispersion of the separated polymers can be facilitated, and fine dispersed particles can be obtained.

Accordingly, the post polymerization may be called a suspension polymerization since the polymerization is conducted in a particle dispersion system. However, since a part of the rubber remains as a micelle in some cases, the post polymerization may be appropriately considered to occur in a state intermediate between emulsion polymerization and suspension polymerization.

In this post polymerization, the initiator and any polymerization promoter or modifier remaining in the first-stage rubber latex can be used directly as they are, and the same or other initiator and polymerization modifier can be further added in accordance with necessity.

For the initiator, any initiator ordinarily used in emulsion polymerization can be used, suitable examples thereof being inorganic initiators such as hydrogen peroxide, potassium peroxide, and ammonium persulfate, and organic initiators such as diisopropylbenzene hydroperoxide and azo-bis-isobutyronitrile. Furthermore, an emulsifier usable for ordinary emulsion polymerization can be used also for improving the dispersibility of the separated polymers in this invention. In addition, a polymerization promoter such as a redox type promoter can be used.

While the monomer subjected to the post polymerization is styrene + methyl methacrylate, this monomer composition may contain, in a range up to 10 percent by weight thereof, a monovinyl or vinylidene monomer copolymerizable with both of these monomers. Specific examples of these comonomers can be found among the specific examples of monomers which copolymerize with the aforementioned conjugated diolefin monomers. Furthermore, the use in this monomer component of small quantities of cross-linking agent copolymerizable with styrene and methyl methacrylate such as a divinyl compound such as divinyl benzene; dimethacrylates such as ethylene glycol dimethacrylate, and/or a chain transfer agent such as normal dodecylmercaptan and tertiary dodecylmercaptan is within the purview of this invention. The cross-linking agent and chain transfer agent are ordinarily used in a quantity less than 3 percent of the quantity of the monomers used in the copolymerization, preferably in a quantity from 0.01 to 1 percent by weight.

A small quantity of a deterioration-preventive agent may be added to the styrene upon completion of the post polymerization. In this post polymerization, these monomers need not be added entirely in a single lot but may be added in two or more separate stages. The quantity of the methyl methacrylate-styrene monomer mixture used in this post polymerization, in general, is from 95 to 30 parts by weight (i.e., a quantity complementary to the rubber quantity, the sum of the two quantities becoming 100 parts by weight), as the total quantity of the copolymers used, with respect to from 5 to 70 parts by weight of the rubber component within the latex.

In this case, when an MBS graft copolymer is used in practice by itself as the methyl methacrylatestyrene resin, a suitable quantity of the methyl methacrylatestyrene monomer mixture used in the post polymerization, as a total quantity, is from 95 to 60 parts by weight, preferably from 95 to 65 parts by weight, with respect to a quantity of the rubber component of more than 5 parts by weight and less than 40 parts by weight, preferably from 5 to 35 parts by weight. If the rubber content is less than 5 parts by weight, good impact resistance cannot be obtained. On the other hand, if it is greater than 40 parts by weight, the resulting polymer will be excessively soft and, by itself, will lack practical value as a synthetic resin.

However, a polymer having a high rubber content in this manner results in a composition of satisfactory impact resistance through mixing thereof with an MS copolymer. More specifically, the MBS graft copolymer in the case where an MBS graft copolymer and an MS copolymer are to be used in practice as a mixture is suitably used in a quantity of from 60 to 30 parts by weight, preferably from 58 to 32 parts by weight, as the total quantity of the methyl methacrylate and styrene monomers used in the post polymerization with respect to a quantity of the rubber content within the latex of from 40 to 70 parts by weight, preferably from 42 to 68 parts by weight.

In this case, a high rubber content is desirable in consideration of the impact resistance, but if it is extremely high, there will be great tendency for lumps to be formed at the time of drying, and the mixing with the MS copolymer will be inconvenient for obtaining a uniform dispersion. On the other hand, if this rubber content is excessively low, there will be a tendency toward decreased effect of imparting impact resistance.

The proportions of the styrene and methyl methacrylate at the time of post polymerization are desirably from 20 to 65 percent by weight, preferably from 25 to 63 percent by weight, of the styrene and from 80 to 35 percent by weight, preferably from 75 to 37 percent by weight, of the methyl methacrylate in consideration of the purpose of causing the index of refraction thereof to approach that of the rubber and also in consideration of the affinity with the MS copolymer and the purpose of causing approaching of indexes of fraction in the case of mixture with an MS copolymer.

However, in the case where the monomers are added in a plurality of separate stages in the post polymerization, it is not necessary that the monomers added in each stage be a polymer mixture of a composition within the above state range. For example, in the beginning, a polymer mixture of styrene, as the predominant constituent, and methyl methacrylate may be first added to carry out a first-stage post polymerization, and then methyl methacrylate monomer by itself or a polymer mixture of methyl methacrylate, as the predominant constituent, and styrene may be added to carry out post polymerization, the only requirement being that, as a final result, the total quantity of the monomers used in the post polymerization be within the above stated ranges.

In the above described manner, whether with the use of an MBS graft copolymer by itself or with the use of a polymer blend thereof with an MS copolymer, a methyl methacrylate-styrene resin having transparency and impact resistance can be obtained.

MS copolymer to be blended

In the preparation of the methyl methacrylatestyrene copolymer used in polymer blending an MBS graft polymer and the MS copolymer, a known polymerization process such as emulsion polymerization, suspension polymerization, or bulk (or mass) polymerization can be used for production of the MS copolymer. In this case, in order to assure good transparency of the composition of the MBS graft copolymer and the MS copolymer, it is desirable that the indexes of refraction of the MBS graft copolymer and of the MS copolymer be close to each other, and for this purpose, the desirable ranges of the proportions of the methyl methacrylate and the styrene are from 40 to 80 percent by weight, preferably from 42 to 78 percent by weight of the methyl methacrylate and from 60 to 20 percent by weight, preferably from 58 to 22 percent by weight of the styrene.

Furthermore, a chain transfer agent such as normal dodecylmercaptan and tertiary dodecylmercaptan can also be used.

The mixing of the MBS graft copolymer and the MS copolymer can be carried out by means of a known machine such as a roll mill, a Bumbury mixer, or an extruder. The desirable mixing proportions of the MBS graft copolymer and the MS copolymer are respectively from 15 to 50 parts by weight, preferably from 20 to 50 parts by weight, and from 85 to 50 parts by weight, preferably from 80 to 50 parts by weight for obtaining good properties of the composition such as impact resistance, workability, and hardness.

In order to indicate still more fully the nature and utility of this invention, the following specific examples of practice illustrating preferred embodiments of the invention are set forth, it being understood that these examples are presented as illustrative only and are not intended to limit the scope of the invention.

Throughout these examples, the tests for the physical properties mentioned were performed as specified below.

The Izod impact strength was measured in accordance with Japanese Industrial Standards JIS K-7110 with the use of test specimens with Vee notches and a thickness of 0.6 cm.

The percent transmission of parallel rays and haze were measured by the use of specimens of 1-mm thickness and by means of a haze meter (using a C filter) of integrating sphere type manufactured by the Toyo Seiki Seisaku-Sho.

Throughout the following Examples, quantities expressed in "parts" are parts by weight.

The weight of solid content in a latex was determined as the weight obtained when the latex was dried in air at 100° C until its weight became constant.

EXAMPLE 1

77 parts of butadiene, 23 parts of styrene, 1.65 parts of potassium oleate as an emulsifier, 200 parts of water, and 0.133 part of azo-bis-isobutyronitrile as a polymerization initiator, were charged into a polymerization vessel and caused to undergo polymerization at 60° C for 9 hours. The resulting latex had a resin concentration of 26 percent in terms of solid content and a conversion of 70 percent.

59 parts of this latex (15 parts of rubber in terms of solid content) was placed in a separate polymerization vessel, and an aqueous solution of 0.6 part of a polyethylene oxide of an average molecular weight of from 300,000 to 500,000 in 300 parts of water was added to this latex. The resulting batch was thoroughly agitated, and the latex was coagulated. To this process system, 60 parts of methyl methacrylate, 40 parts of styrene, and 0.7 part of benzoyl peroxide as an initiator were added, and polymerization was carried out at 60° C for 17 hours.

The resulting polymerization product was in the form of suspension particles of a diameter of approximately 1 mm, and the yield was substantially 100 percent. After this polymerization product was subjected to an after treatment of ordinary filtering, washing, and drying, it was roll-kneaded at 160° C for 3 minutes and then press formed at 190° C for 6 minutes thereby to fabricate Izod test specimens. This material was a beautiful resin of excellent transparency.

As reference samples for comparison, resin were produced by the procedure specified above except for the use of a polyethylene oxide of low molecular weight (average molecular weight of 7,500) and methylcellulose (average molecular weight of 26,000) for the coagulating agent in a quantity of 0.6 part in each case. It was found that in cases where low molecular weight polyethylene oxide and methylcellulose were used, polymerization formed products could not be obtained as suspension particles. These polymerization products for comparison were similarly subjected to after treatment, and thereafter Izod test specimens were made therefrom.

The results of impact test are shown in Table 1.

Table 1

| Sample | Coagulating Agent | Izod Impact Strength, with V-notch (kg.cm/cm) |
|---|---|---|
| Example 1 | High molecular weight polyethylene oxide (average molecular weight 300,000 - 500,000) | 18.4 |
| Comparison Example | Low molecular weight polyethylene oxide (average molecular weight 7,500) | 2.1 |
| Comparison Example | Methylcellulose (average molecular weight 26,000) | 3.7 |

Only when high molecular weight polyethylene oxide is used as a coagulating agent at the time of post polymerization, a transparent resin having a high impact resistance (strength) is obtained.

EXAMPLE 2

77 parts of butadiene, 23 parts of styrene, 1.25 parts of potassium oleate as an emulsifier, 200 parts of water, and 0.133 part of azo-bis-isobutylonitrile as a polymerization initiator were charged into a polymerization vessel and caused to undergo polymerization at 60° C for 8 hours. The resulting latex had a resin concentrations of 17 percent in terms of solid content and a conversion of 44 percent.

88 parts of this latex (15 parts of rubber in terms of solid content) was placed in a separate polymerization vessel, and an aqueous solution of 0.6 part of a polyethylene oxide of an average molecular weight of from 300,000 to 500,000 to 300 parts of water was added to this latex, and the resulting batch was throughly agitated.

To this process system, 60 parts of methyl methacrylate, 40 parts of styrene, and 0.7 part of benzoyl peroxide as an initiator were added, and polymerization was carried out at 60° C for 17 hours.

The resulting polymerization product was in the form of suspension particles of a diameter of approximately 1 mm, an the yield was substantially 100 percent. After this polymerization product was subjected to an after treatment of ordinary filtering, washing, and drying, it was roll-kneaded at 160° C for 3 minutes and then press formed at 190° C for 6 minutes thereby to fabricate Izod test specimens, which when tested, exhibited a Vee-notch Izod impact strength of 19.7 kg.cm/cm.

EXAMPLE 3

77 parts of butadiene, 23 parts of styrene, 1.25 parts of potassium oleate as an emulsififer, 200 parts of water, and 0.267 part of azo-bis-isobutylonitrile were charged into a polymerization vessel and caused to undergo polymerization at 60° C for 8 hours. The resulting latex had a resin concentration of 23 percent in terms of solid content and a conversion of 79 percent.

68 parts of this latex (15 parts of rubber in terms of solid content) was placed in a separate polymerization vessel, and an aqueous solution of 0.6 part of a polyethylene oxide of an average molecular weight of from 300,000 to 500,000 in 300 parts of water was added to this latex, the resulting batch then being thoroughly agitated.

To this process system, 60 parts of methyl methacrylate, 40 parts of styrene, and 0.7 part of benzoyl peroxide as an initiator were added, and polymerization was carried out at 60° C for 17 hours.

The resulting polymerization product was in the form of suspension particles of a diameter of approximately 1mm, and the yield was substantially 100 percent.

This polymerization product was formed into Izod test specimens in the manner described in Example. The transparency of these specimens was good. The Vee-notch Izod impact strength of the resin as indicated by these specimens was 19.3 kg.cm/cm.

EXAMPLE 4

77 parts of butadiene, 23 parts of styrene, 1.25 parts of potassium oleate as an emulsifier, 200 parts of water, and 0.3 part of azo-bis-isobutylonitrile were charged into a polymerization vessel and caused to undergo polymerization at 60° C for 48 hours. The resin concentration in terms of solid content of the resulting latex was 33 percent, and the conversion was substantially 100 percent. (Hereinafter, this latex will be called "Latex L".)

45 parts of this latex L (15 parts of rubber in terms of solid content) was placed in a separate polymerization vessel, and an aqueous solution of 0.4 part of a polyethylene oxide of an average molecular weight of trom 4,000,000 to 6,000,000 was added to this latex, the resulting batch then being thoroughly agitated.

To this process system was added a mixture of 60 parts of methyl methacrylate and 40 parts of styrene and 0.75 part of potassium persulfate (KPS), and polymerization was carried out at 60° C for 5 minutes. Thereafter 0.7 part of benzoyl peroxide (BPO) was added to the process system, and reaction was completed at 60° C.

The resulting polymerization product was in the form of fine suspension particles.

As reference samples for comparison, resins were produced by the procedure specified above except for the use of a polyethylene oxide of low molecular weight (average molecular weight of 7,500) and methylcellulose (average molecular weight of 26,000) for the coagulating agent in a quantity of 0.4 part in each case. It was found that in cases where low molecular weight polyethylene oxide and methylcellulose were used, polymerization formed products could not be obtained as suspension particles.

Figure 1A:
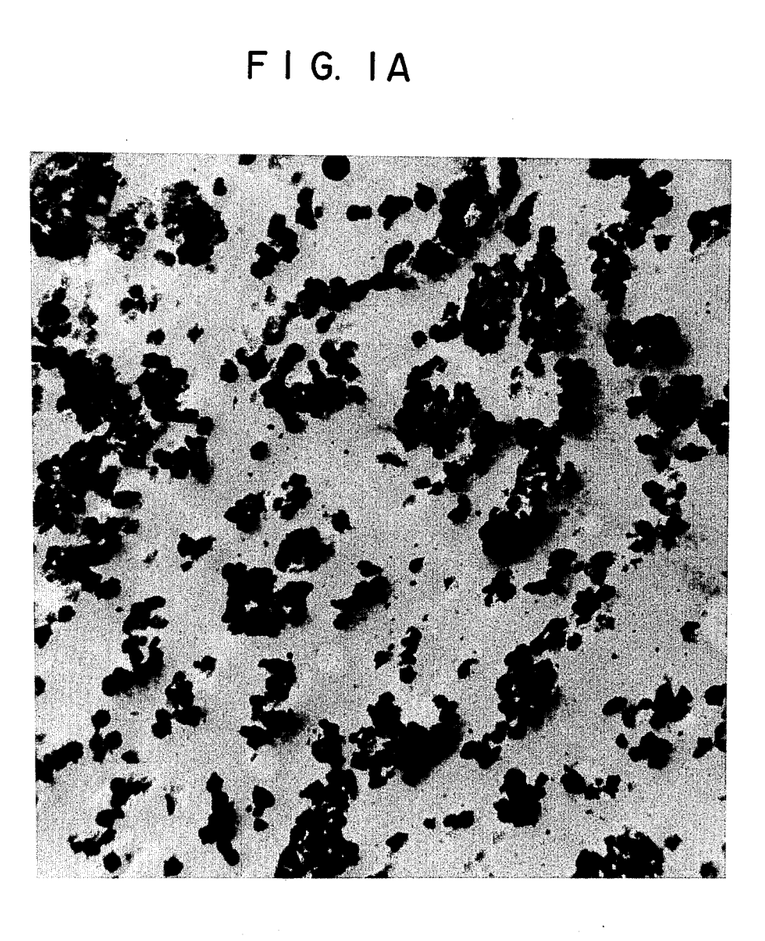
FIGS. 1A, 1B, and 2 are photomicrographs of transmission type, taken by means of an electron microscope, respectively showing examples of states of dispersion of rubber in impact-resistant thermoplastic resins obtained in accordance with this invention.
Figure 1B:
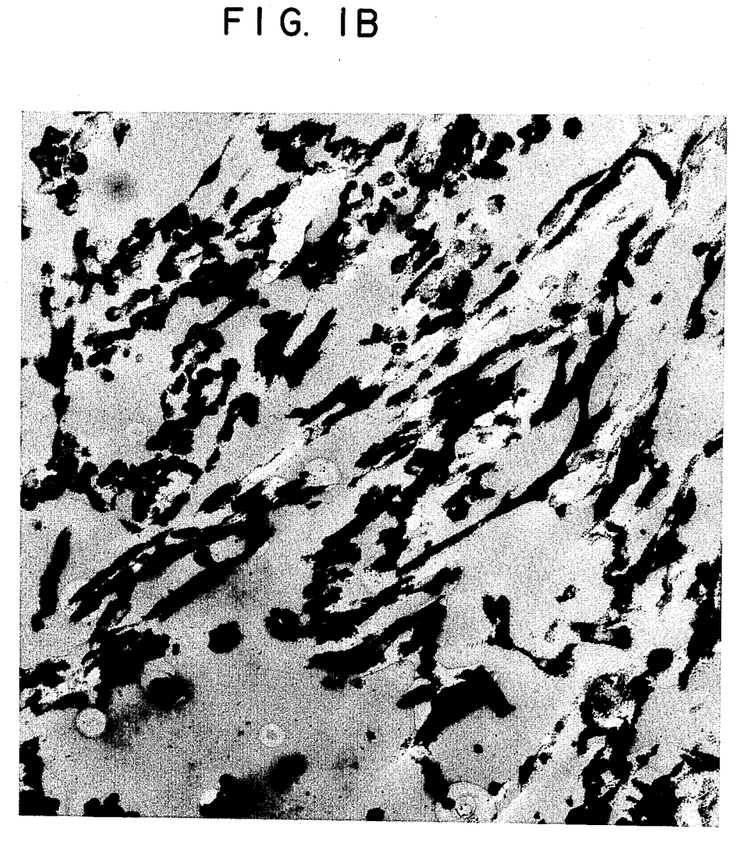

The formed products of the instant Example 4 and those of the comparison examples were treated and formed into Izod test specimens in the manner described in Example 1. These specimens were used to determine Vee-notch Izod impact strength, whereupon the results set forth in Table 2 were obtained.

the polymerization formed products A and B. The rubber is uniformly distributed as fine lumps of a size of the order of 1 micron or an elongated linear aggregates of lengths of from 1 micron to several microns.

While the form of the rubber, i.e., whether it assumes the form of fine lumps or of linear aggregates, varies with the conversion of the rubber latex and the degree of polymerization of the polyethylene oxide, a low conversion of the rubber or a high degree of polymerization of the polyethylene oxide, in general, causes the rubber to assume the form of linear aggregates. Since the rubber in any cases assumes a form of fine aggregates of suitable size, the formed product has a trans- Table 2

| Sample | Coagulating Agent | Polymerization Initiator | Izod Impact Strength (kg.cm/cm) |
| --- | --- | --- | --- |
| Example 4 | High molecular weight polyethylene oxide (average molecular weight of from 4,000,000 to 6,000,000) | KPS, BPO both used | 13.0 |
| Comparison Example | Low molecular weight polyethylene oxide (average molecular weight 7,500) | KPS, BPO both used | 6.1 |
| Comparison Example | Methylcellulose | KPS, BPO both used | 7.5 |

For imparting impact resistance to the resin, a polyethylene oxide of high molecular weight is necessary as a coagulating agent.

EXAMPLE 5

77 parts of butadiene, 23 parts of styrene, 1.25 parts of potassium oleate as an emulsifier, 0.5 part of azo-bis-isobutyronitrile as a polymerization initiator, and 100 parts of water were charged into a polymerization vessel and caused to undergo polymerization of 60° C for 9 hours. After the polymerization was stopped, 100 parts of water were further added. The resin concentration in terms of solid content of the resulting latex was 20 percent, and the conversion was 52 percent.

A. 75 parts of this latex (15 parts of rubber in terms of solid content) was placed in a separate polymerization vessel, and an aqueous solution of 0.6 part of a polyethylene oxide of an average molecular weight of from 300,000 to 500,000 in 300 parts of water was added to the latex, the resulting batch being thoroughly agitated. To this process system, 60 parts of methyl methacrylate, 40 parts of styrene, and 0.7 part of benzoyl peroxide as an initiator were added, and polymerization was carried out at 60° C for 17 hours.

B. The procedure specified in the above paragraph A) was carried out except for the use of 0.2 part of a polyethylene oxide of an average molecular weight of from 4,000,000 to 6,000,000.

The formed products of polymerization A and B were suspension particles of a particle diameter of approximately 1 mm, and the yield was approximately 100 percent in both cases.

These formed products of polymerization A and B were subjected to an after treatment of ordinary filtration, washing, and drying and were then rollkneaded at 160° C for 3 minutes and press-formed at 190° C for 6 minutes into Izod test specimens.

The Vee-notch Izod impact strength of both resins A and B was 18.4 kg.cm/cm.

Photomicrographs of transmission type taken by means of an electron microscope of Izod test specimens formed from the formed products of polymerization A and B of Example 5 are shown respectively in FIGS. 1A and 1B, in both of which the magnification is 27,600 X. (A) and (B) in these figures correspond respectively to parency comparable to that of a product wherein single particles of rubber of the same composition are dispersed and, in comparison with said product, has impact strength.

EXAMPLE 6 a. To 100 parts of the latex L prepared according to Example 4, 100 parts of water was added at room temperature, and then 20 parts (0.184 part of the polyethylene oxide quantity) of a 0.92-percent aqueous solution of a polyethylene oxide of an average molecular weight of from 300,000 to 500,000 was further added to cause coagulation.

After this coagulation, 1.5 parts of a 15.5-percent aqueous solution of potassium oleate was added to the process system, and then 11 parts of methyl methacrylate, 8 parts of styrene, 8.5 parts of a 2-percent aqueous solution of potassium persulfate, and 0.07 part of divinylbenzene were further added thereto, polymerization then being carried out at 60° C for 18 hours.

A polymer in a form of a latex with some polymer mass precipitated out was obtained.

0.3 part of a phenolic antioxidant was added to this polymer, which was then subjected to "salting out" with addition of hydrochloric acid. The yield of the MBS graft copolymer thus obtained was approximately 96 percent.

By the above described procedure except for a polyethylene oxide quantity at the time of coagulation of 0.093 part, an MBS graft copolymer of exactly the same recipe was obtained. The yield was 97 percent. Furthermore, for the purpose of comparison an MBS graft copolymer wherein coagulation with a polyethylene oxide was not carried out was also produced with the above described recipe except that a polyethylene oxide was not used.

b. On one hand, 60 parts of methyl methacrylate, 40 parts of styrene, 300 parts of water, 0.7 part of benzoyl peroxide, 0.1 part of a polyethylene oxide of an average molecular weight of from 4,000,000 to 6,000,000 as a suspension agent, 0.072 part of sodium lauryl sulfate, and 2.7 parts of sodium sulfate were charged into a polymerization vessel and polymerized at 60° C for 17 hours, whereupon an MS copolymer in the form of beautiful pearl-like particles was obtained in a yield of 98.5 percent.

Then, 30 parts of the MBS graft copolymer obtained by the procedure of (a) above and 70 parts of the MS copolymer obtained by the procedure of (b) above were roll-kneaded at 160° C for 3 minutes, and the resulting mixture was press-formed at 195° C into excellent transparent test specimens.

With these specimens, their Izod impact strength, light transmissivity, and haze were measured, whereupon the results shown in Table 3 were obtained.

Table 3

|  | Quantity of Polyethylene Oxide Use at Time of Coagulation | Proportion of Polyethylene Oxide Relative to Rubber in Latex | Izod Impact Strength, V-notch (kg.cm/cm) | Parallel Light Ray Transmission (%) | Haze (%) |
|---|---|---|---|---|---|
| Example (x) | 0.184 part | 0.55 part | 18 | 83 | 8.6 |
| Example (y) | 0.092 part | 0.27 part | 8.4 | 82 | 9.7 |
| Comparison Example | 0 | 0 | 1.8 | 88 | 3.0 |

These results indicate that the impact resistance in the case where rubber coagulated with a polyethylene oxide is used is far superior to that in the case of rubber which has not been coagulated.

In order to indicate the difference between the case where the butadiene-styrene copolymer rubber latex is coagulated with high molecular weight polyethylene oxide and the case where it is not so coagulated in the preparation of the MBS graft copolymer for the composition of MBS graft copolymer — MS copolymer of Example 6, slices were taken from the specimens corresponding to (x) and (z) of Example 6 and subjected to treatment for rendering them visible by means of an electron microscope, and then electron microscope photomicrographs thereof were taken with a magnification of 27,000 X. The photomicrograph shown in FIG. 2 correspond to example (x) of Example 6 and shows a product wherein a butadiene-styrene copolymer rubber latex has been coagulated with a high molecular weight polyethylene oxide, while the photomicrograph shown in FIG. 3 corresponds to comparison example (z) in Example 6 and shows a product wherein the rubber latex has not been coagulated.

Figure 2:
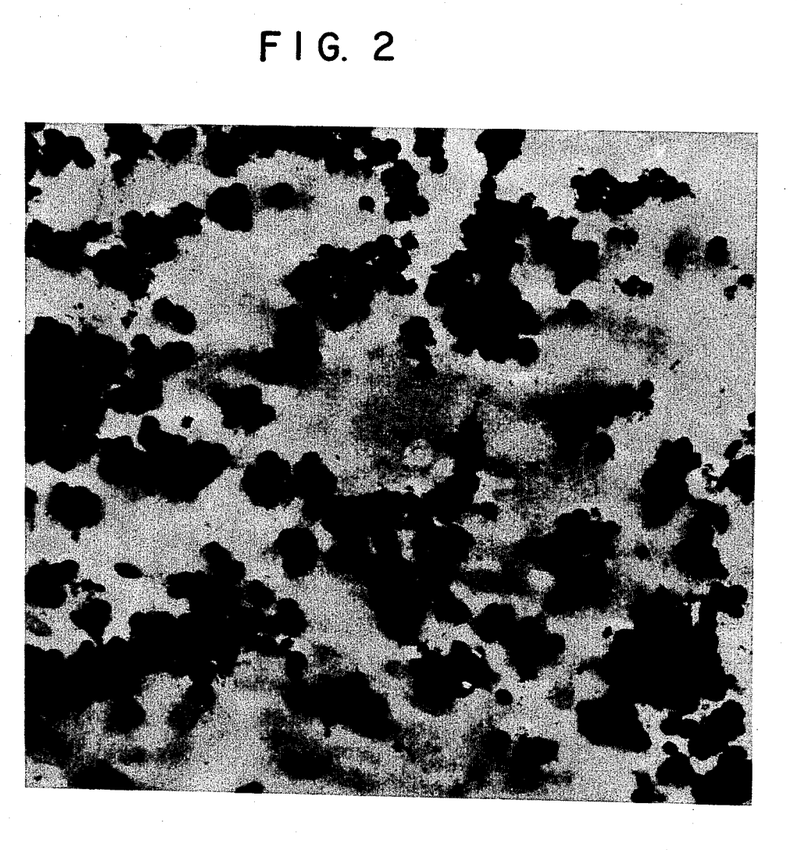
Figure 3:
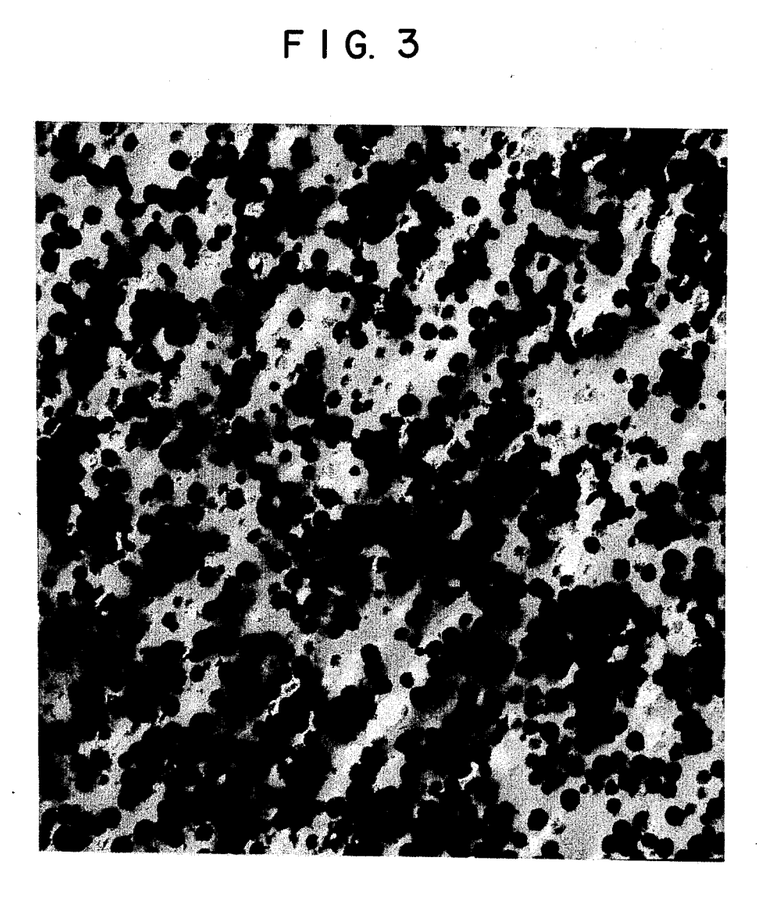
FIG. 3 is a similar photomicrograph showing an example of rubber dispersion state of a control resin for contrast.

As is apparent from these two photomicrographs, in the case where the rubber latex has been coagulated with a high molecular weight polyethylene oxide, the rubber is dispersed in larger forms.

EXAMPLE 7 a. To 100 parts of the butadiene-styrene copolymer rubber latex L prepared according to Example 4, 100 parts of water was added at room temperature, and then 20 parts (0.184 part as polyethylene oxide quantity) of a 0.92-percent aqueous solution of a polyethylene oxide of an average molecular weight of from 300,000 to 500,000 and variable quantity of a 15.5-percent aqueous solution of potassium oleate were further added thereto thereby to carry out coagulation.

Then 11 parts of methyl methacrylate, 8 parts of styrene, variable quantity of divinylbenzene, and 8.5 parts of a 2-percent aqueous solution of potassium persulfate were added to the process system, and polymerization was carried at 60° C for 17 hours. The quantities of the potassium oleate and the divinylbenzene used in the above described procedure were as follows.

|  | 15.5% aqueous solution of potassium oleate (parts) | Quantity of potassium oleate (parts) | Quantity of divinylbenzene (parts) |
|---|---|---|---|
| A | 5 | 0.775 | 0.07 |
| B | 5 | 0.775 | 0 |
| C | 10 | 1.55 | 0.07 |
| D | 10 | 1.55 | 0 |

The polymer in each case was obtained in a state wherein the greater part thereof was precipitated and finely distributed.

0.5 part of a phenolic antioxidant was added to each polymer, which was then "salted out" with hydrochloric acid, whereupon an MBS graft copolymer was obtained.

b. On one hand, 60 parts of methyl methacrylate, 40 parts of styrene, 100 parts of water, 0.7 parts of benzoyl peroxide, and 0.15 part of a polyethylene oxide of an average molecular weight of from 4,000,000 to 6,000,000 as a suspension agent were charged into a polymerization vessel, and polymerization was carried out at 60° C for 18 hours, whereupon transparent suspension polymerized particles were obtained in a yield of 98.5 percent.

The MBS graft copolymer obtained by the procedure (a) above and the MS copolymer obtained by the procedure (b) above were roll-kneaded at 160° C or 175° C for 3 minutes and then formed at 190° C into samples which were found to have good transparency in all cases.

The Izod impact strength, light transmissivity of 1-mm plate, and haze of each of these samples were measured, whereupon the results set forth in Table 4 were obtained.

Table 4

| Mixing proportion | Roll temp. (° C) | Izod impact strength (kg.cm/cm) | Parallel ray transmission (%) | Haze (%) |
|---|---|---|---|---|
| A 30 PMS 70 | 160 | 15 | 89 | 3.0 |
| B 30 PMS 70 | '' | 19 | 87 | 4.7 |
| B 15 PMS 85 | '' | 8 | 88 | 5.1 |
| C 30 PMS 70 | '' | 16 | 86 | 4.2 |
| D 30 PMS 70 | '' | 18 | 88 | 2.0 |
| D 20 PMS 80 | '' | 13 | 90 | 2.0 |
| B 30 PMS 70 | 175 | 19 | | |

Note: Mixing proportion is weight ratio.
PMS: methyl methacrylate-styrene copolymer.

EXAMPLE 8

To 100 parts of the butadiene-styrene copolymer rubber latex L prepared as prescribed in Example 4, 100 parts of water was added at room temperature, and thereafter a variable quantity of a 1-percent aqueous solution of a polyethylene oxide of an average molecular weight of from 300,000 to 500,000 was further added thereto thereby to cause coagulation.

Then, after 66 parts of water was further added to the process system, 10 parts of a 15.5-percent aqueous solution of potassium oleate, 11 parts of methyl methacrylate, 8 parts of styrene, and 9 parts of a 2-percent aqueous solution of potassium persulfate were added thereto, and polymerization was carried out at 60° C for 18 hours.

As a result, polymers were obtained in a state wherein the greater part of each had precipitated, and the particles were well dispersed.

Similarly as in the other Examples, 0.3 part of a phenolic antioxidant was added to the polymers to effect "Salting out" with an acid, whereupon an MBS graft copolymer was obtained.

In the above process, the quantities of the polyethylene oxide of variable quantity and the resulting yields were as follows.

|   | 1% aqueous solution polyethylene oxide (parts) | (Net quantity of polyethylene oxide) (part) | Yield (%) |
|---|---|---|---|
| A | 40 | (0.4) | 99 |
| B | 30 | (0.3) | 98 |

Each of these MBS graft copolymers and the MS copolymer prepared in accordance with procedure (b) in Example 7 were roll-kneaded at 160° C for 3 minutes in a proportion of MBS/PMS = 30/70 and then press-formed at 195° into test specimens, which were tested for Izod impact strength.

The results are set forth in Table 5. The resulting products had good transparency.

Table 5

| MBS used | Polyethylene oxide quantity (part) | Quantity of polyethylene oxide relative to rubber in latex (part) | Izod impact strength of MBS-PMS composition (kg.cm/cm) |
|---|---|---|---|
| A | 0.4 | 1.2 | 19 |
| B | 0.3 | 0.9 | 18 |

EXAMPLE 9

The process specified in procedure (a) of Example 7 was carried out as prescribed except for the use of 10 parts (0.1 part as polyethylene oxide quantity) of a 1-percent aqueous solution of a polyethylene oxide of an average molecular weight of from 4,000,000 to 6,000,000 used for coagulation, whereupon an MBS graft copolymer was obtained in a yield of 99 percent.

Furthermore, as a comparison example, an MBS graft copolymer was prepared in accordance with D of procedure (a) of Example 7 except for the use of 26 parts (0.26 part as polyethylene glycol quantity) of a 1-percent aqueous solutions of a polyethylene glycol of an average molecular weight of approximately 7,500 in place of a polyethylene oxide of high molecular weight as a water-soluble polymer used for coagulation.

As another comparison example, an MBS graft copolymer was prepared also in the same manner according to D of procedure (a) of Example 7 except for the use of 20 parts (0.2 part as polyvinyl alcohol quantity) of a 1-percent aqueous solution of a polyvinyl alcohol of an average degree of polymerization of 2,200 as a coagulting agent.

As a further comparison example, an MBS graft copolymer was prepared also in the same manner according to D of procedure (a) of Example 7 except for the use of a methylcellulose of a molecular weight of 26,000 in the form of a 1-percent aqueous solution in a quantity of 20 parts (0.2 part as methylcellulose quantity) as a coagulating agent.

In each of the comparison examples wherein polyethylene glycol, polyvinyl alcohol, and methylcellulose are respectively used as coagulating agents, the product retained its latex form in a substantially complete state after post polymerization.

Furthermore, the yields were from 98 to 99 percent.

Each of these MBS graft copolymers and an MS copolymer obtained according to procedure (b) in Example 7 were roll-kneaded at 160° C for 3 minutes in a proportion of MBS/PMS = 30/70 and then press-formed at 195°, whereupon a sample of good transparency was obtained in each case.

The Izod impact strengths of these samples were measured, whereupon the results shown in Table 6 were obtained.

Table 6

|   | Coagulating agent | Izod impact strength (kg.cm/cm) |
|---|---|---|
| Example | Polyethylene oxide (average molecular weight of from 4,000,000 to 6,000,000) | 18 |
| Comparison Example | Polyethylene glycol (average molecular weight 7,500, approx.) | 5.0 |
| Comparison Example | Polyvinyl alcohol (average degree of polymerization 2,200) | 4.5 |
| Comparison Example | Methylcellulose (molecular weight 26,000) | 2.3 |

It is apparent from these results that the improvements in impact strength in the cases where polyethylene glycol, polyvinyl alcohol, and methylcellulose are used are less than that in the case where polyethylene oxide of high molecular weight is used.

EXAMPLE 10

To 129 parts of the butadiene-styrene rubber latex prepared in Example 1, of a conversion of approximately 70 percent in terms of solid content with a resin concentration of 26 percent, 100 parts of water was added at room temperature, and then 20 parts of a 1-percent aqueous solution of polyethylene oxide of an average molecular weight of from 300,000 to 500,000 was further added thereto thereby to cause coagulation.

To this process system, 10 parts of a 15.5-percent aqueous solution of potassium oleate, 11 parts of methyl methacrylate, 8 parts of styrene, and 9 parts of a 2-percent aqueous solution of potassium persulfate were added, and polymerization was carried out at 60°

C for 18 hours. In this case also, the greater part of the polymer thus obtained was in a precipitated state.

Similarly as in the preceding Examples, a phenolic antioxidant was added to the polymer, and then "salted out" with HC*l* was carried out, whereupon an MBS graft copolymer was obtained in a yield of 96 percent.

This MBS graft copolymer and the MS copolymer obtained by the procedure (b) in Example 7 were rollkneaded at 160° C for 3 minutes in a proportion of MBS/PMS = 30/70 and then press-formed at 195° C into a sample, which was tested for Izod impact strength. The result was 8.3 kg.cm/cm.

What we claim is:

1. A process for producing thermoplastic resin compositions of excellent transparency and impact resistance which comprises
   1. causing a monomer component consisting essentially of methyl methacrylate and styrene in a weight ratio of from 8/20 to 30/65 to undergo post polymerization in the presence of from 40 to 70 parts by weight, in terms of solid component, of a conjugated diolefin polymer rubber latex containing at least 50 percent by weight of a conjugated diolefin monomer, the total weight of the post polymerization monomers being from 95 to 60 parts by weight, there being from 0.01 to 2.0 parts by weight of a polyethylene oxide of an average molecular weight of at least 100,000 added to said rubber latex to cause the rubber latex to partially coagulate, thereby preparing a graft copolymer,
   2. causing from 40 to 80 percent by weight of methyl methacrylate and from 60 to 20 percent by weight of styrene to copolymerize, thereby preparing a methyl methacrylate-styrene copolymer, and
   3. mixing from 15 to 50 parts by weight of said graft copolymer with from 85 to 50 parts by weight of said methyl methacrylate-styrene copolymer.

2. A process as claimed in claim 1 in which said polyethylene oxide is added to the rubber latex prior to the start of said post polymerization.

3. A process as claimed in claim 1 in which said polyethylene oxide is added to the rubber latex at the time of said post polymerization.

4. A process as claimed in claim 1 in which said conjugated diolefin polymer rubber latex contains butadiene as said conjugated diolefin monomer and styrene as a monomer copolymerizable therewith.

5. A process as claimed in claim 1 in which the average molecular weight of said polyethylene oxide is from 100,000 to 20,000,000.

6. A process as claimed in claim 1 in which the average molecular weight of said polyethylene oxide is from 300,000 to 6,000,000.

* * * * *